United States Patent
Guenther et al.

(10) Patent No.: US 9,621,018 B2
(45) Date of Patent: Apr. 11, 2017

(54) SYSTEMS FOR INDIRECT AVERAGE CURRENT MEASUREMENT

(71) Applicant: Texas Instruments Incorporated, Dallas, TX (US)

(72) Inventors: Gary D. Guenther, Clarendon Hills, IL (US); Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 60 days.

(21) Appl. No.: 13/950,021

(22) Filed: Jul. 24, 2013

(65) Prior Publication Data

US 2013/0307512 A1 Nov. 21, 2013

Related U.S. Application Data

(63) Continuation-in-part of application No. 12/973,489, filed on Dec. 20, 2010, now abandoned.

(51) Int. Cl.
*H02M 1/00* (2006.01)
*H02M 3/158* (2006.01)

(52) U.S. Cl.
CPC ............. *H02M 1/00* (2013.01); *H02M 3/158* (2013.01); *H02M 2001/0009* (2013.01)

(58) Field of Classification Search
CPC . H02M 3/158; H02M 2001/0009; H02M 1/00
USPC ........ 323/222–225, 271, 273, 282–288, 364; 324/120, 416; 363/16, 20, 21.01–18, 62, 363/74, 78, 84, 95, 97, 131; 327/540, 327/134, 327
See application file for complete search history.

(56) References Cited

U.S. PATENT DOCUMENTS

| | | | | |
|---|---|---|---|---|
| 5,457,620 A | * | 10/1995 | Dromgoole | 363/20 |
| 5,627,740 A | * | 5/1997 | Johari | 363/78 |
| 5,903,449 A | | 5/1999 | Garrigan et al. | |
| 5,912,552 A | | 6/1999 | Tateishi | |
| 6,064,187 A | | 5/2000 | Redl et al. | |

(Continued)

FOREIGN PATENT DOCUMENTS

RU 128433 U1 5/2013

OTHER PUBLICATIONS

"Op Amp Filter Circuits," Electronic Devices and Circuits, Engineering Sciences 154, URL http://people.seas.harvard.edu/~jones/es154/lectures/lecture_1/filters/filters.html, Oct. 5, 2001, pp. 1-7 (R. Victor Jones).

(Continued)

*Primary Examiner* — Gary L Laxton
*Assistant Examiner* — Jye-June Lee
(74) *Attorney, Agent, or Firm* — William B. Kempler; Charles A. Brill; Frank D. Cimino

(57) ABSTRACT

One example of the invention relates to a power system. The power system can include a switching power converter configured to convert an input voltage to an output voltage for providing power at an output thereof to which a load is connectable. A measurement system can include measurement circuitry configured to measure an average of an accessible current in the power converter during both continuous and discontinuous modes of operation and derive an average measurement of another current in the power converter based on timing control signals used to control operation of the power converter.

18 Claims, 7 Drawing Sheets

(56) References Cited

U.S. PATENT DOCUMENTS

| | | | |
|---|---|---|---|
| 6,191,564 B1 | 2/2001 | Mao | |
| 6,246,215 B1 | 6/2001 | Popescu-Stanesti | |
| 6,469,491 B1 * | 10/2002 | Schultz | 324/120 |
| 6,960,904 B2 | 11/2005 | Matsuura et al. | |
| 7,088,598 B2 | 8/2006 | Yang et al. | |
| 7,254,044 B2 * | 8/2007 | Perry et al. | 363/20 |
| 7,279,868 B2 | 10/2007 | Lanni | |
| 7,615,981 B2 | 11/2009 | Wong et al. | |
| 7,642,762 B2 | 1/2010 | Xie et al. | |
| 7,663,352 B2 * | 2/2010 | Yang et al. | 323/271 |
| 7,795,846 B2 * | 9/2010 | Martin | 323/222 |
| 7,906,941 B2 | 3/2011 | Jayaraman et al. | |
| 7,923,973 B2 | 4/2011 | Odell | |
| 8,024,138 B2 * | 9/2011 | Carroll et al. | 702/60 |
| 8,098,506 B2 | 1/2012 | Saint-Pierre | |
| 8,587,967 B2 * | 11/2013 | Cohen | 363/21.04 |
| 8,659,273 B2 | 2/2014 | McDonald et al. | |
| 8,680,820 B2 | 3/2014 | Harrison | |
| 8,742,738 B2 | 6/2014 | Houston | |
| 8,866,455 B2 | 10/2014 | Jeong et al. | |
| 8,941,366 B2 | 1/2015 | Halsted | |
| 2004/0188717 A1 | 9/2004 | Ono | |
| 2005/0219870 A1 | 10/2005 | Yang et al. | |
| 2005/0275392 A1 | 12/2005 | Wong et al. | |
| 2006/0097705 A1 | 5/2006 | Cheung et al. | |
| 2007/0008756 A1 | 1/2007 | Djenguerian et al. | |
| 2008/0197817 A1 | 8/2008 | Colbeck et al. | |
| 2009/0179619 A1 | 7/2009 | Houston | |
| 2010/0308733 A1 | 12/2010 | Shao | |
| 2011/0182088 A1 | 7/2011 | Lidak et al. | |
| 2011/0309811 A1 | 12/2011 | Kondo et al. | |
| 2012/0153920 A1 | 6/2012 | Guenther et al. | |
| 2013/0049623 A1 | 2/2013 | Murakami | |
| 2013/0307512 A1 | 11/2013 | Guenther et al. | |
| 2015/0061614 A1 | 3/2015 | Cohen | |
| 2015/0137785 A1 | 5/2015 | Stevens | |

OTHER PUBLICATIONS

PCT/US2014/053004 Search Report, mailed Dec. 4, 2014.
RU128433U1, English Machine Translation.
R. Victor Jones, "Op Amp Filter Circuits," Electronic Devices and Circuits, Engineering Sciences 154, URL http://people.seas.harvard.edu/~jones/es154/lectures/lecture_1/filters/filters.html, Oct. 5, 2001, pp. 1-7.
Non-Final Office Action for U.S. Appl. No. 13/532,492 (now U.S. Pat. No. 8,941,366), mailed Apr. 10, 2014 (10 pages).
Notice of Allowance With References for U.S. Appl. No. 13/532,492 (now U.S. Pat. No. 8,941,366), mailed Aug. 27, 2014 (10 pages).
ST Microelectronics, "L6562, Transition-Mode PFC Controller," Nov. 2005, Rev. 8, pp. 1-16.
Non-Final Office Action for U.S. Appl. No. 14/455,582, mailed Jan. 15, 2016, 9 pages.

* cited by examiner

SYSTEMS FOR INDIRECT AVERAGE CURRENT MEASUREMENT

CROSS-REFERENCE TO RELATED APPLICATIONS

This application is a continuation-in-part application of application Ser. No. 12/973,489 filed Dec. 20, 2010, which is incorporated herein by reference in its entirety.

TECHNICAL FIELD

The invention relates generally to electronic circuits and, more specifically, to systems for indirect average current measurement.

BACKGROUND

Various types of power converter topologies exist for converting electrical energy to one form or the other, such as from AC to DC, from DC to AC and DC to DC. In most converter topologies, to implement current control, feedback associated with output current must be directly sensed. Sometimes, however, direct access to the output may not be available or may significantly increase the cost or it can add additional inefficiencies. For instance, if no direct access is available to an output load current, it may be necessary to level shift or transfer load current information across the isolation barrier.

SUMMARY

The invention relates generally to electronic circuits and, more specifically, to systems for indirect average current measurement.

As one example, a system can include a power converter configured to convert an input voltage to an output voltage for providing power at an output thereof to which a load is connectable. A measurement system can include measurement circuitry configured to measure an average of an accessible current in the power converter and derive an average measurement of another current in the power converter based on a timing control signal used to control operation of the power converter.

As another example, a power system can include an input source to supply input power and a power converter configured to convert the input power to an output power. The power converter can include a switch to conduct a switch current in response to a timing signal having a timing period, an inductor to conduct current based at least in part on the switch current and a rectifier configured to conduct current based at least in part on the switch current. The system can also include a measurement system configured to provide a measure of average current through the switch during a selected portion of the timing period, the selected portion of the timing period depending on a topology of the power converter.

DETAILED DESCRIPTION

This invention provides systems and methods for indirect average current measurement. The systems and methods can be implemented to measure an unknown average current of a power converter based on measuring an accessible average current in the power converter and based on appropriate timing signals. The approach can be considered topology agnostic in that it is equally applicable to the numerous types of generic converter topologies including buck, boost and buck-boost (e.g., flyback) topologies as well as various single-ended and double-ended variations thereof.

By way of example, certain example embodiments will be described herein with respect to selected power converter topologies. Based on the examples herein, it will be understood and appreciated the general applicability of the approach to various other power converter topologies. Depending on application and the converter topology, it is possible that a current of interest may be inaccessible for measurement. The approach shown and described herein allows measurement of an accessible average current to derive a measure of one or more inaccessible average currents.

Figure 1:
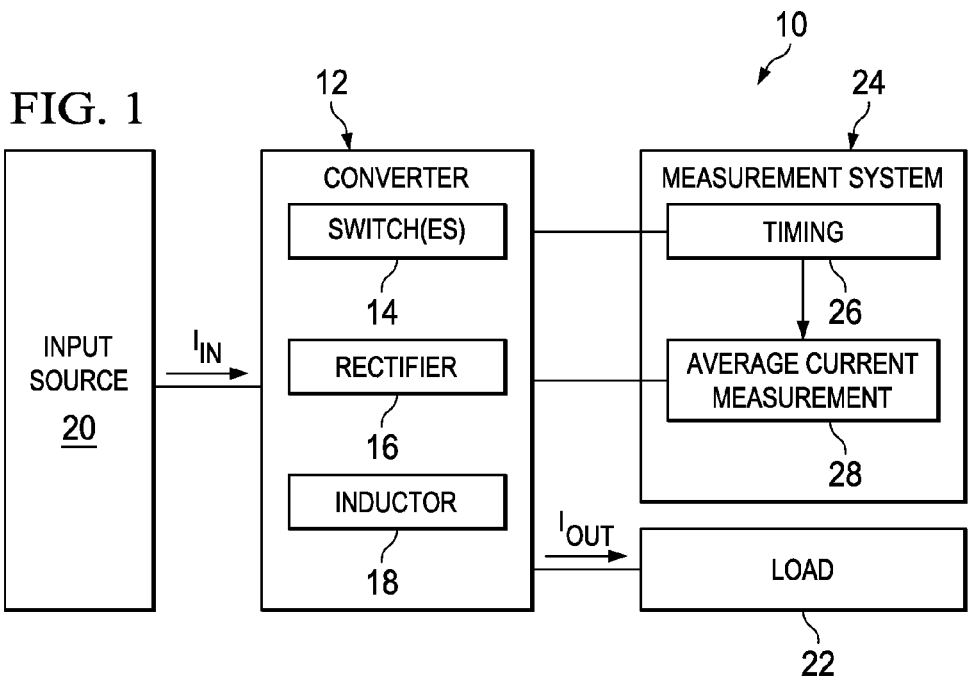
FIG. 1 depicts an example of a power system.

Turning to FIG. 1, a simplified block diagram of a generic power system 10 is illustrated. The power system 10 includes a power converter, schematically indicated at 12. It is to be understood that the power converter 12 can correspond to virtually any converter topology, such as buck, boost, buck-boost or variations thereof. Such power converter further can be isolated (e.g., employing a transformer) or non-isolated and further may be implemented as single-ended or double-ended converters. The power converter 12 can include one or more switches 14, a rectifier 16, and one or more inductors 18. The connections between these elements 14, 16 and 18 thus will vary according to the topology of the power converter 12. The power system 10 also includes an input source 20 that supplies an input voltage and a corresponding input current ($I_{IN}$) to the power converter 12. The converter 12 converts the input voltage to a corresponding output voltage and output current ($I_{OUT}$) that can be supplied to a load 22.

A measurement system 24 can be connected to the power converter 12 to provide an average measure of an unknown or otherwise inaccessible current based on timing parameters and an accessible average current. The measurement system 24 can be connected to the converter in a manner depending upon the topology of the converter as well as which of the current value or values are to be determined.

As shown in the example of FIG. 1, the measurement system 24 includes a timing measurement component 26. The timing measurement component 26 can measure timing parameters of the converter 12. For instance, the timing parameters can represent timing during which current conducts through one or more of the switch(es) 14, rectifier (16) and inductor 18. The timing measurement component 26 can be configured to measure such timing parameter(s), which can vary depending on the particular converter topology and application requirements. The timing measurement component 26 can also be configured depending upon the conduction mode of the power converter 12. For instance, the timing measurement component 26 can measure different timing parameters and in different manners if the power converter is operating in a continuous conduction mode, a discontinuous conduction mode or a transition mode.

The measurement system 24 also includes an average current measurement block 28. The average current measurement block 28 can be configured to determine an unknown or inaccessible average current of the converter 12 based on measuring an accessible one of the currents and based on the timing parameters provided by the timing component 26. For example, the measurement system 24 can be configured to determine the average input current based upon measuring an average output current. Alternatively, the measurement system 24 can be configured to determine an average output current based on measuring an average input current. Such measurements from the converter 12 are based upon the realization that certain fundamental relationships between the input and output currents as well as the average currents through the switches 14, the rectifier 16 and the inductor 18 exist in most (if not all) converter topologies.

Figure 2:
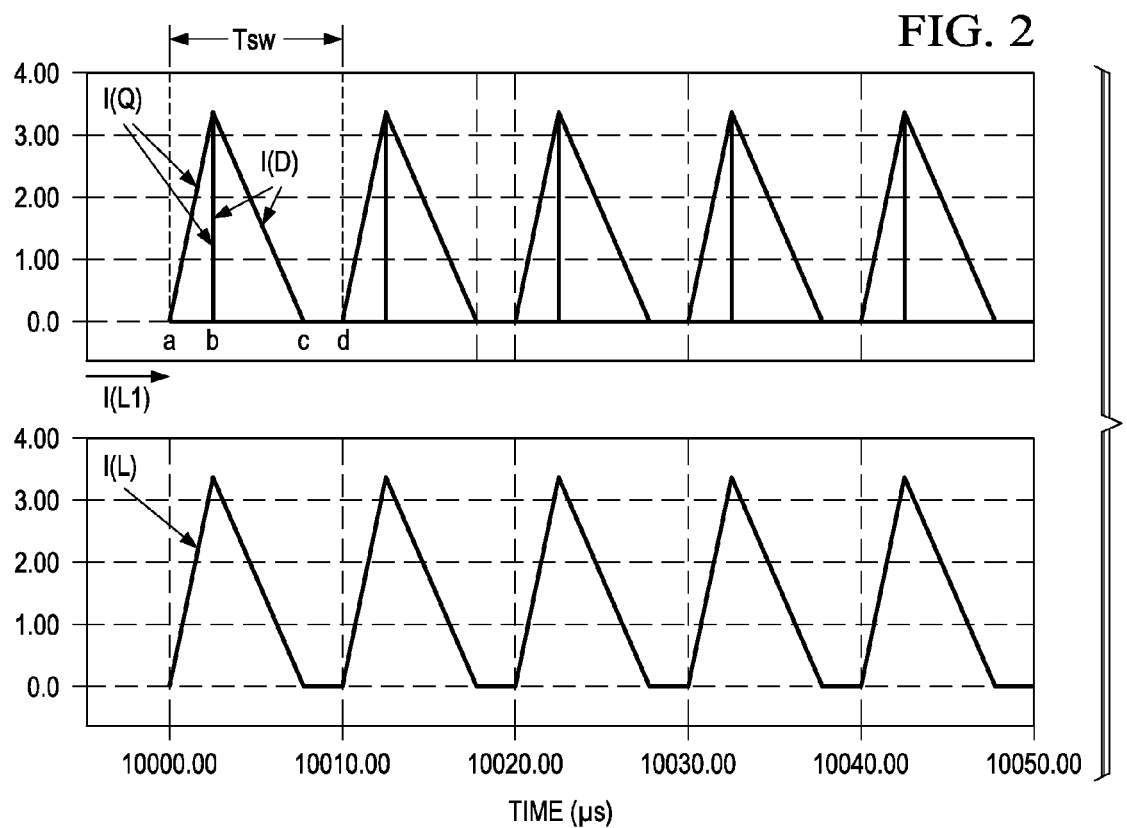
FIG. 2 is a graph depicting an example of input and output current for a power converter operating in a discontinuous conduction mode.
Figure 3:
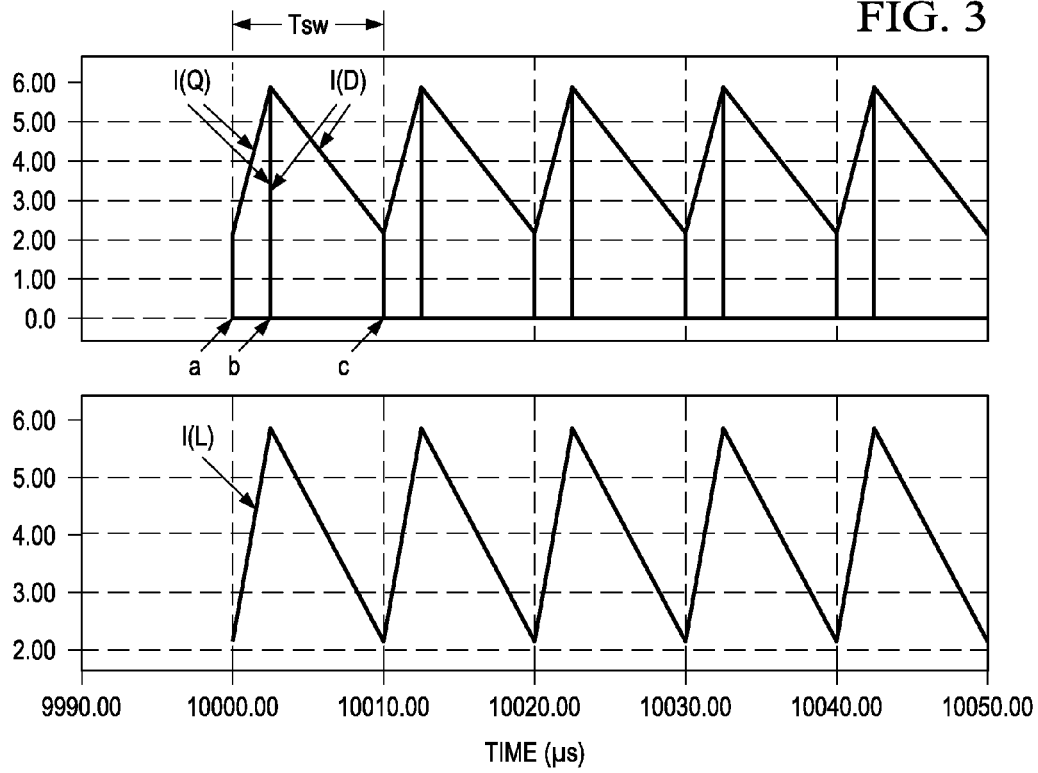
FIG. 3 is a graph depicting an example of input and output current for a power converter operating in a continuous conduction mode.

For purposes of the following example, the following nomenclature is utilized: the current through the switch(es) 14 can be represented as I(Q), current through the rectifier (e.g., a diode) can be represented as I(D) and current through the inductor 18 can be represented as I(L). The switching period for each switch 14 can be represented as $T_{SW}$. Referring to FIGS. 2 and 3, timing diagrams for a flyback converter in two different conduction modes are depicted.

In the example of FIG. 2, the relationship between current through the switch 14, the rectifier 16 and inductor 18 are demonstrated for a discontinuous conduction mode (DCM). The switch current I(Q) rises from time 'a' to time 'b' and at time 'b' the current through the switch goes to zero as demonstrated in FIG. 2. The current through the rectifier I(D) is at zero from time 'a' to time 'b' and at time 'b', current I(D) through the diode rises and in this example is equal to the current through the switch at the time 'b' when the switch current turned off. The current through the diode decreases between time 'b' and 'c' until it reaches zero where it remains at zero from time 'c' to time 'd'. Between time 'c' and time 'd' represents the discontinuous portion of the DCM. The switch period $T_{SW}$ thus corresponds to the time from time 'a' to time 'd'. Also shown in FIG. 2 is the inductor current I(L), which tracks the switch current I(Q) increasing from time 'a' to time 'b', tracks the rectifier current I(D) decreasing from time 'b' to time 'c' to zero, and remains off from time 'c' to time 'd'. This current relationship repeats for each period according to the switching operation at times 'a', 'b', 'c' and 'd' in the example of FIG. 2.

FIG. 3 depicts an example of current waveforms of a flyback converter operating in continuous conduction mode (CCM). Again, the switch current is indicated at I(Q), the current through the rectifier is indicated at I(D) and the inductor current is indicated at I(L). Similar to the DCM mode of FIG. 2, the switch current I(Q) increases from time 'a' to time 'b', which in the example of FIG. 3 is indicated at rising from 2 to about 6 units of current. At time 'b', the switch current I(Q) decreases from its maximum down to its minimum current of zero where it remains from time 'b' to time 'c'. The current through the rectifier I(D) is at zero between 'a' to time 'b' and, at time 'b', the current through the diode (in response to the switch turning off) conducts, from a maximum current of about six units decreasing to about two units between time 'b' and time 'c'. At time 'c', the switch activates thereby increasing the current. In the CCM, the timing of 'c' can be considered equal to time 'd' such that the switching period $T_{SW}$ is equal to the on-time of the switch plus the on-time of the rectifier. The current through the inductor I(L) tracks the switch current and the rectifier current during their respective conduction times, such as to provide a triangular current waveform, as shown in FIG. 3.

The timing relationships for both FIGS. 2 and 3 can be expressed as follows:

$$b-a=T_{ON}(Q)$$

$$c-b=T_{ON}(D)$$

$$d-a=T_{SW}$$

For the transition or continuous conduction modes 'c' is equal to 'd' such that $T_{ON}(Q)+T_{ON}(D)=T_{SW}$.

Referring back to FIG. 1 and in consideration of the basic converter topologies of the buck, boost and buck-boost converters, it can be shown that the average current through the switch, the average current through the diode and the average current through the inductor can be represented as follows:

$$I_{ave(Q)} = \frac{1}{b-a}\int_a^b I_Q(t)\cdot dt \qquad \text{Eq. 1}$$

Where $I_{avg(Q)}$ is the average current through switch Q $$I_{ave(D)} = \frac{1}{c-b}\cdot \int_b^c I_D(t)\cdot dt \qquad \text{Eq. 2}$$

Where $I_{avg(D)}$ is the average current through the diode D $$I_{ave(L)} = \frac{1}{c-a}\cdot \int_a^c I_L(t)\cdot dt = I_{ave(Q)} = I_{ave(D)} \qquad \text{Eq. 3}$$

Where $I_{avg(L)}$ is the average current through the inductor L

Additionally, for the three generic converter topologies buck, boost and buck-boost, it can be shown that the following relationships exist:

$$I_{L(ave)} = I_{ave(L)}\cdot \frac{T_{on(Q)}+T_{on(D)}}{T_{sw}} \qquad \text{Eq. 4}$$

Where $I_{L(avg)}$ is the average load current $$I_{L(ave)} = I_{Q(ave)}\cdot \frac{T_{on(Q)}+T_{on(D)}}{T_{sw}} = I_{D(ave)}\cdot \frac{T_{on(Q)}+T_{on(D)}}{T_{sw}} \qquad \text{Eq. 5}$$

For the buck converter, the input and output currents can be expressed as follows:

$$I_{in(ave)} = I_{ave(Q)}\frac{T_{on(Q)}}{T_{sw}} \qquad \text{Eq. 6}$$

-continued $$I_{out(ave)} = I_{L(ave)} \qquad \text{Eq. 7}$$

Where $I_{in(avg)}$ is the average input current and $I_{out(avg)}$ is the average output current For the boost converter, the input and output currents can be expressed as follows:

$$I_{in(ave)} = I_{L(ave)} \qquad \text{Eq. 8}$$

$$I_{out(ave)} = I_{ave(D)} \cdot \frac{T_{on(D)}}{T_{sw}} \qquad \text{Eq. 9}$$

$$I_{out(ave)} = I_{ave(Q)} \cdot \frac{T_{on(D)}}{T_{sw}} \qquad \text{Eq. 10}$$

For the buck-boost converter, the input and output currents can be expressed as follows:

$$I_{in(ave)} = I_{ave(Q)} \cdot \frac{T_{on(Q)}}{T_{sw}} \qquad \text{Eq. 11}$$

$$I_{out(ave)} = I_{ave(D)} \cdot \frac{T_{on(D)}}{T_{sw}} \qquad \text{Eq. 12}$$

since $I_{ave(D)} = I_{ave(Q)} = I_{ave(L)}$ $$I_{out(ave)} = I_{ave(L)} \cdot \frac{T_{on(D)}}{T_{sw}} \qquad \text{Eq. 13}$$

The measurement system 24 can be utilized to measure any of the average current variables in a converter in any corresponding topology. Timing information for the switches 14 is available from timing signal (e.g., from a controller or signal generator) and can be utilized to provide timing parameters for the average current measurement. For example, the timing information can be obtained by logic and corresponding connections that are utilized to control the respective switches for sampling signals from the power converter 12. This timing information can be provided to the average current measurement component 28 to enable the average current measurement to be made for determining the average current of the inaccessible or unknown variable consistent with the equations 6-13 depending on the converter topology. The conduction timing of rectifier 16 can be deduced by monitoring the voltage across inductor 18 (either directly or by means of a sense winding magnetically coupled to the inductor, such as winding 126 shown in FIG. 9). The voltage across the inductor exhibits large changes in value when the rectifier 16 starts or stops conducting, so a sensing circuit 125 (shown in FIG. 9) can produce a signal indicative of the conduction state of rectifier 16. The sensing circuit 125 shown in FIG. 9 may comprise a comparator (not shown), for example.

Figure 4:
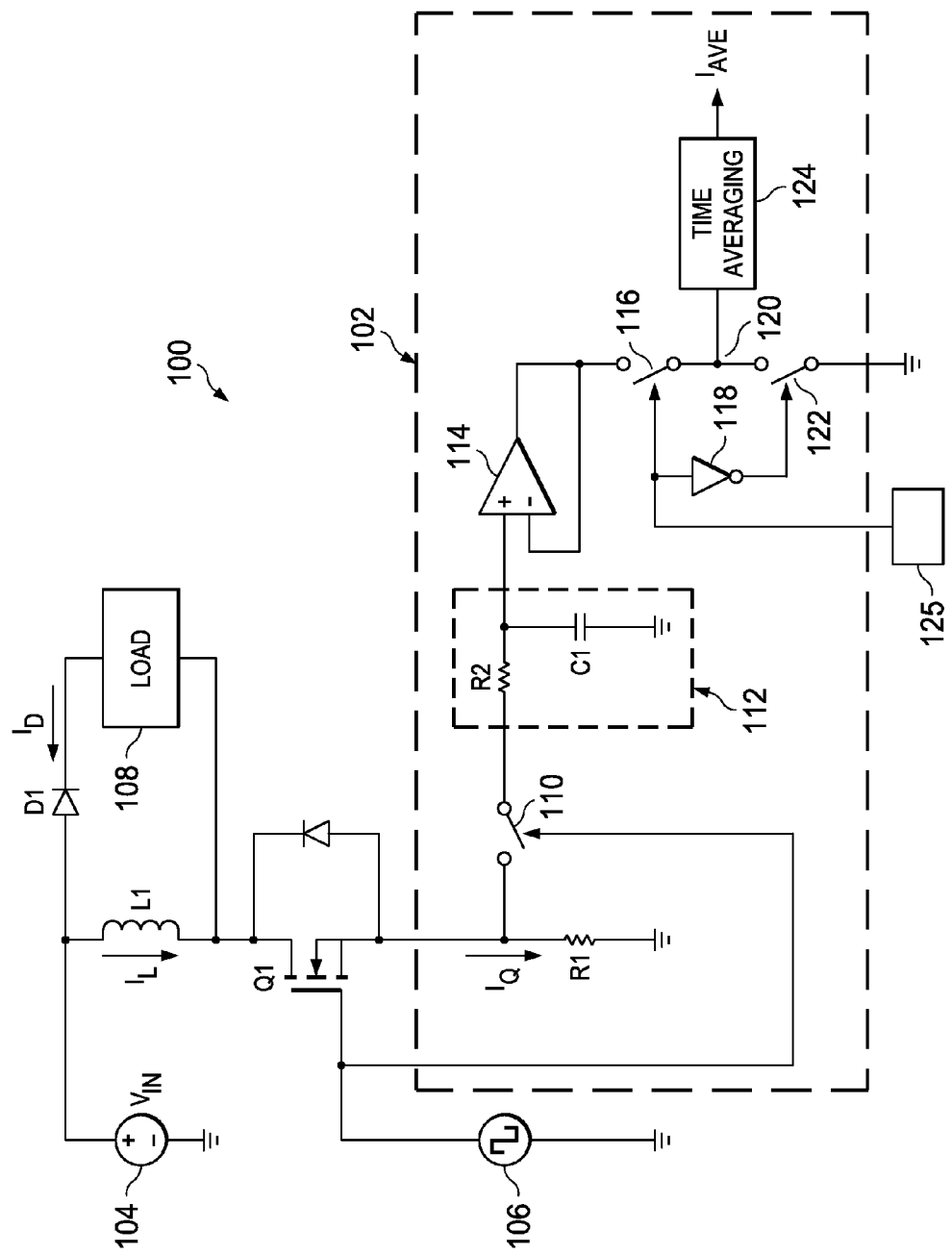
FIG. 4 depicts an example of a flyback power converter.

By way of example, FIG. 4 depicts an example of a buck-boost (e.g., or flyback) power converter system 100. The system 100 includes a measurement system 102 that can be utilized to provide a measurement for a desired average current, indicated at $I_{AVE}$. The power system 100 includes an input source 104 that supplies an input voltage $V_{IN}$ to the power converter.

In the example of FIG. 4, the power system 100 includes an inductor at L1 that is connected between the input supply and a switch Q1. A signal generator (e.g., a modulator) 106 provides a timing signal to control the switch Q1 in an on or off state. The switch Q1 can be implemented as one or more MOSFET device, although it could be implemented as other types of switch devices. The signal generator 106 can provide a fixed or variable duty cycle signal to the gate of the transistor Q1. Also in the example of FIG. 4, a load 108 is connected in series with a rectifying diode D1 in parallel across the inductor L1. While in the example of FIG. 4, the inductor L1 is indicated as a single inductor, it will be understood and appreciated that the inductor could be part of a transformer, which can include a primary side winding and a secondary side winding. The secondary side of the transformer, in such example, can supply electrical current to the load based upon the turns ratio of the transformer. Thus those skilled in the art will understand and appreciate that the approach shown and described herein is equally applicable to isolated and non-isolated power converters.

A shunt resistor R1 is coupled between the switching transistor Q1 and ground. In response to operation of the switch Q1 based upon the control signal at its gate, current flows from the input source 104 through the transistor Q1 and through the resistor R1 to ground. This current flow through the transistor and the resistor R1 provides a voltage across R1 corresponding to the switch current indicated at $I_Q$. Additionally, while the switch Q1 conducts current, such current $I_Q$ is equal to the current through the inductor L1, which current is indicated as $I_L$. When the switch Q1 is turned off to a non-conducting state, the current $I_Q$ goes to zero and the inductor current $I_L$ is then equal to the current through the diode D1 indicated as $I_D$.

From FIG. 2 it can be shown that the average current through the switch $I_Q$ during the on-time of the switch (based on the timing signal from the signal generator 106) is equal to the average current through the diode $I_D$ when the diode is conducting, and the average current through the diode is equal to the output current through the load 108, which is connected in series. For example, the measurement system 102 can be configured to measure the average current $I_Q$ through the switch Q1 during conduction of the switch. The time average of the measured switch current $I_Q$ when the diode is conducting is equal to the average output current through the load 108.

By way of example, the voltage across the resistor R1 is proportional to the current through the inductor L1 during conduction of the switch Q1. Thus, a switch 110 is connected to the node between the transistor switch Q1 and resistor R1. The switch 110 operates in response to the timing signal at the gate of Q1, such that the voltage across R1 can be sampled during conduction of the switch Q1 by an averaging circuit 112. In the example of FIG. 4, the averaging circuit 112 is demonstrated as an RC circuit including a resistor R2 and a capacitor C1. It will be appreciated that other types of averaging circuits can also be utilized. The averaging circuit 112 provides a voltage that is proportional to the average current through the switch Q1 during conduction of the switch Q1. This voltage can be provided to a buffer 114. The buffer 114 provides a buffered output corresponding to the average current through the switch Q1 during conduction of Q1.

The measurement system 102 also includes logic to sample the average current signal from the buffer 114 during conduction of the diode D1. Thus, in the example of FIG. 4, the diode conduction sensor 125 the timing control signal to a switch 116 that is coupled to the output of the buffer 114. The switch 116 is activated by the output of conduction sensor 125 to connect an output node 120 with the output of the buffer 114 during a time in which the diode D1 conducts the current $I_D$. When the Q1 is on, such that the switch current flows through Q1, another switch 122 (coupled between the node 120 and ground) is activated by the output of inverter 118 to pull the node 120 to ground corresponding to a non-conducting state for the diode D1 and the load 108.

A time averaging component 124 can be coupled to the node 120 to provide a time average measure of the output of the buffer during conduction of the diode D1, indicated at $I_{AVE}$. The time average measure corresponds to the average output current $I_{AVE}$ through the load 108. Those skilled in the art will understand and appreciate various types of time averaging circuitry and devices that can be utilized as the time averaging component 124. For instance, the time averaging component 124 can be implemented to include analog circuitry, digital circuitry, signal processing techniques or any combination thereof. Additionally, while the example of FIG. 4 demonstrates an open loop configuration in which a signal generator 106 provides the timing signal, the signal at the node 120 can also be utilized to implement a closed current loop control, such as demonstrated in FIG. 5.

Figure 5:
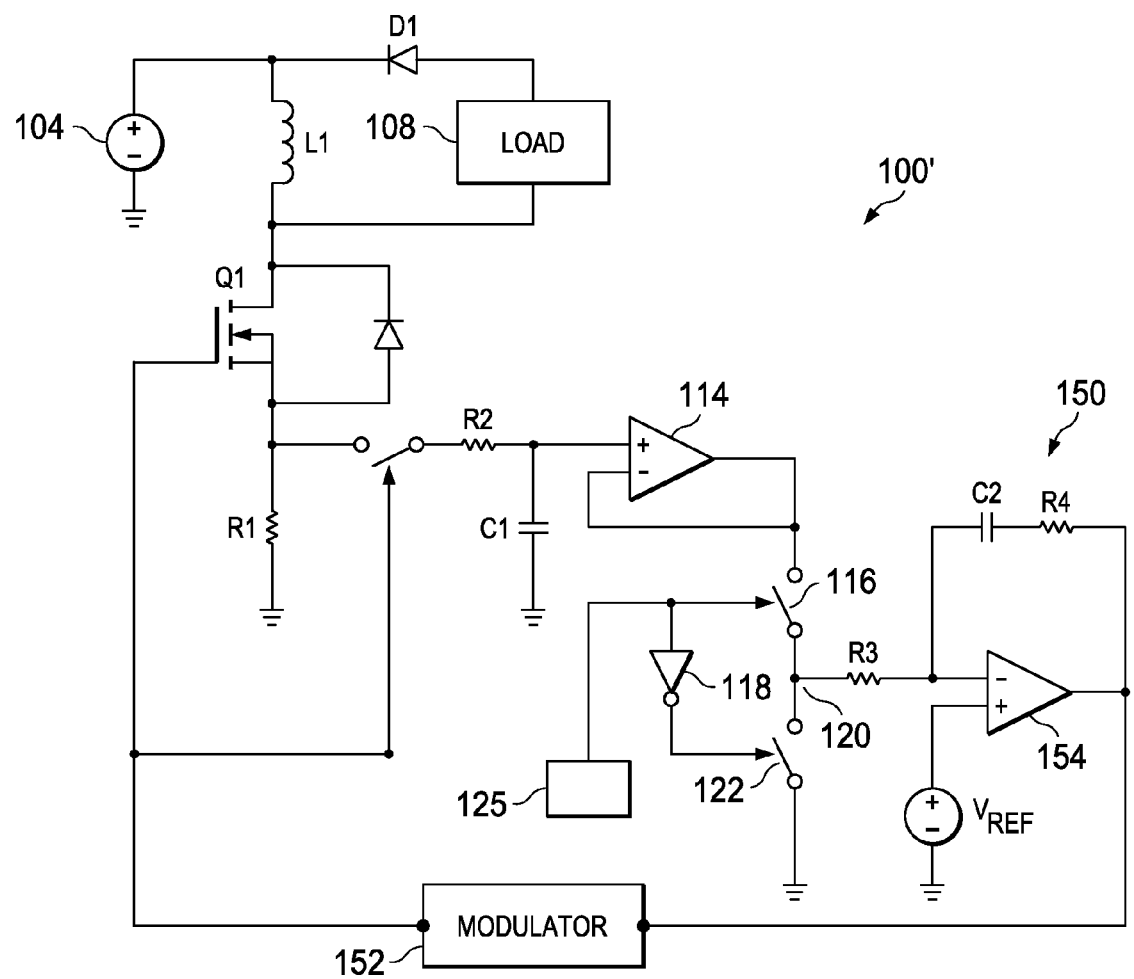
FIG. 5 depicts an example of a power converter that can be implemented according to a boost topology.

In the example of FIG. 5, all components previously introduced with respect to FIG. 4 are demonstrated by identical reference numbers and reference characters. However, instead of having the time average component generate the $I_{AVE}$ for another purpose, the system 100' includes an error amplifier 150 that provides an error signal to an input of a modulator 152. The output of the modulator 152 is utilized to drive the switch Q1 such that closed current loop control can be implemented. Thus, the input current $I_Q$ through the switch Q1 can be utilized by the error amplifier to indirectly measure the average output current through the load 108 to control operation of the power converter.

In the example of FIG. 5, the error amplifier 150 includes a resistor R3 that is coupled between the node 120 and an inverting input of an amplifier 154. The error amplifier 150 is configured as an integrator circuit to perform time averaging (e.g., similar to the time average component 124 of FIG. 4) by connecting a series resistor R4 and capacitor C2 between the output of the amplifier 154 and its inverting input. A reference voltage $V_{REF}$ is supplied to the non-inverting input of the amplifier 154. The amplifier 154 compares the reference voltage relative to a voltage corresponding to the average output current to generate the error signal that is supplied as the corresponding input to the modulator 152. In this way, closed loop current control can be implemented without direct measurement of the average output current to the load 108, but instead based on indirect measurement derived from measurement of the switch current and selected timing information. While the closed loop current control example in FIG. 5 is shown with respect to the buck-boost power converter system 100 of FIG. 4, similar closed loop current control can be implemented with respect to any topology including those shown and described herein as well as variations thereof.

Figure 6:
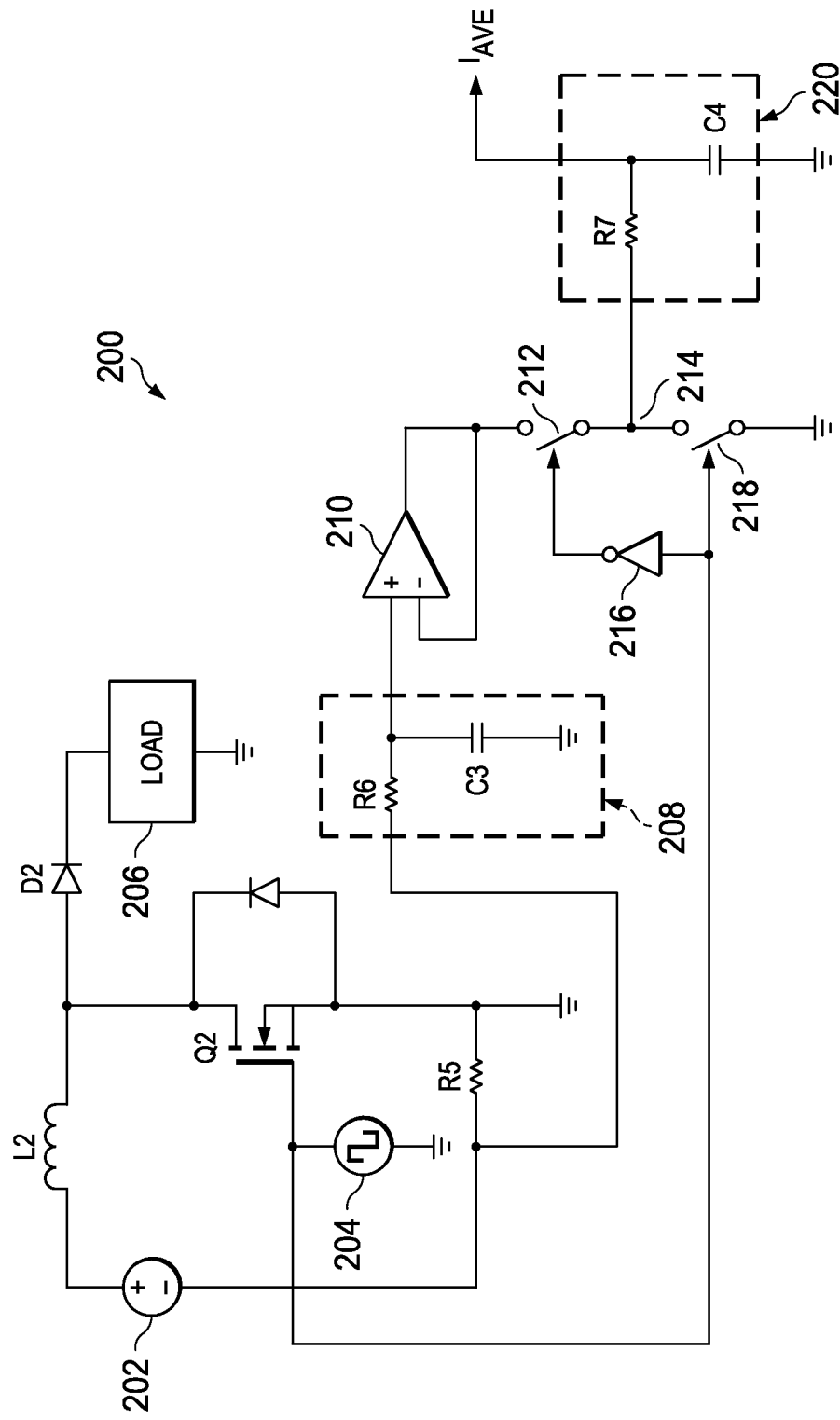
FIG. 6 depicts an example of a power converter that can be implemented according to a buck topology.

FIG. 6 provide an example of average current measurements systems that can be utilized in conjunction with a boost converter topology operating in a continuous mode. While this example demonstrate indirect measurement of the average output current based on measurement of the average input current, any average current can be derived based on measurements of another current based on the teachings herein.

The boost power converter system 200 of FIG. 6 includes an input source 202 that provides a DC input voltage for the converter system. The input source 202 is connected to an inductor L2, and a transistor switch Q2 is connected between the conductor L2 and ground. A signal generator (e.g., or modulator) 204 controls operation of the switch Q2 by generating a corresponding timing signal, such as a square wave. As described herein, the signal generator 204 can be implemented in an open loop or closed loop manner. A load 206 is connected to an output of system 200 via a diode D2. Thus, in response to the activation of the switch Q2, current flows through the inductor L2 and through the Q2. No current flows through the diode D2 during the conduction of current through Q2. When the converter operates in continuous conduction, conduction of diode D2 is complementary to the conduction of switch Q2.

In the example of FIG. 6, the average current through the diode D2 corresponds to the average output current to the load 206. A resistor R5 connected between ground and a negative terminal of the input source 202 generates a voltage corresponding to current flow through inductor L2. An averaging circuit is connected to detect the voltage across R5 and provide an average indication thereof to a buffer 210. In the example of FIG. 6, the averaging circuit 208 is depicted as an RC network including a resistor R6 and a capacitor C3. The average voltage (corresponding to the average current through the inductor L2) is supplied to a buffer 210, which provides an indication of the average current through the inductor L2.

A switch network of switches 212 and 218 is coupled to receive the output of the buffer 210. An intermediate node 214 between the switches 212 and 218 provides a corresponding sampled output. An inverter 216 inverts the timing signal (provided to the gate of Q2) from the signal generator 204 to provide the inverted signal to operate the switch 212 such that the output of the buffer is coupled to the node 214 when Q2 is off. As mentioned above, this timing corresponds to conduction time for the diode D2, which conducts current when the switch Q2 is off. Another switch 218 is connected between the node 214 and ground and is operated based on the timing signal to the gate Q2 such that the node 214 is coupled to ground when Q2 is on.

Time averaging circuitry 220 can be connected at the node 214 to average this signal and provide a time averaged measure of output current $I_{AVE}$. That is, the time average signal $I_{AVE}$ provided by the time average component 220 corresponds to the average current through the load 206. In the example of FIG. 6 the time average component 220 is depicted as including a resistor R7 and a capacitor C4, although time averaging can be implemented by other types of analog circuitry, digital circuitry, signal processing or the like. Additionally, similarly as shown and described with respect to FIG. 5, the averaging component 220 could be implemented as part of an error amplifier to provide closed loop current control for the boost power converter system 200.

Figure 7:
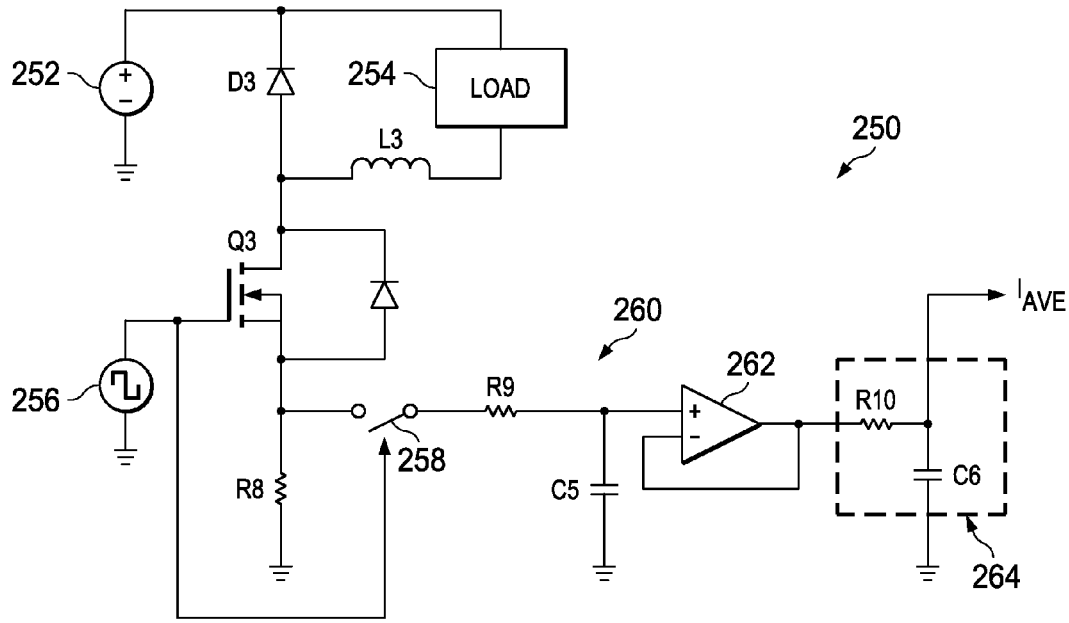
FIG. 7 depicts an example of a closed-loop current control power converter.

FIG. 7 depicts an example of a power converter system 250 configured with a measurement system to measure an average current for a buck converter topology. The buck power converter includes an input source 252 that provides a DC input voltage for the power converter. A switch Q3 is connected to control current flow through an inductor L3 that is connected in series with a load 254. The series load and L3 are connected in parallel with a diode D3 between Q3 and the input source 252. In this example, current flow through the inductor L3 occurs when current flows through the switch Q3 based on a timing control signal from a signal generator (e.g., or modulator) 256. For the buck converter, it can be shown that the average current through the inductor L3 is equal to the average current through the switch Q3 during conduction of the switch Q3 plus the average current through the diode D3 during conduction of the diode D3 for each switching period. Thus, the measurement system is configured to measure the time average current through the switch Q3 during its conduction and measure the time average of such average current over the entire switching period. In this way the measurement system can provide an output $I_{AVE}$, which is proportional to the average output current through the load.

In the example of FIG. 7, a shunt resistor R8 is connected between the switch Q3 and ground for providing a voltage that represents the current through the switch Q3. A switch 258 is connected between the interconnecting node of Q3 and R8 for sampling the voltage across R8 during conduction of the switch Q3. Thus, the switch 258 can be controlled based on the timing control signal provided by the signal generator 256 to the gate of Q3. An average circuit 260 is connected to average the sampled voltage across R8 as to provide an average indication of the current through Q3. The average circuit 260 can be implemented, for example, by a resistor R9 and a capacitor C5. The time average voltage across C5 can be provided to a buffer 262 to provide a buffered indication of the average current through Q3. In this example, the buffer 262 provides isolation between the average circuit 260 and an output time average component 264. This can be contrasted with the examples of FIGS. 4 and 5 in which switching networks and timing signals are utilized to provide sufficient isolation. Thus, in the example of FIG. 7, the averaging component 264 can provide an average indication of the output current through the load, demonstrated at $I_{AVE}$. For example, the averaging component 264 can be implemented as a resistor R10 and a capacitor C6. Alternatively, the averaging component can be implemented in other types of averaging circuits or devices and/or as part of an error amplifier that can be utilized to provide closed loop current control, such as for controlling the signal generator 256.

In the example of FIG. 5, the regulated output current is directly proportional to the reference voltage $V_{REF}$. The reference voltage $V_{REF}$ can be fixed to provide constant current or it can be variable, such as to provide an adjustable output current. For instance, the regulated current can be decreased to arbitrarily low levels by reducing the reference voltage $V_{REF}$. However, as the amplitudes of the currents in the power stage are reduced, the errors introduced by the analog circuits become proportionally larger and tend to degrade the accuracy of the control as the output current is approaches zero. In order to mitigate the errors associated with decreasing the regulated current, an additional control loop can be implemented.

Figure 8:
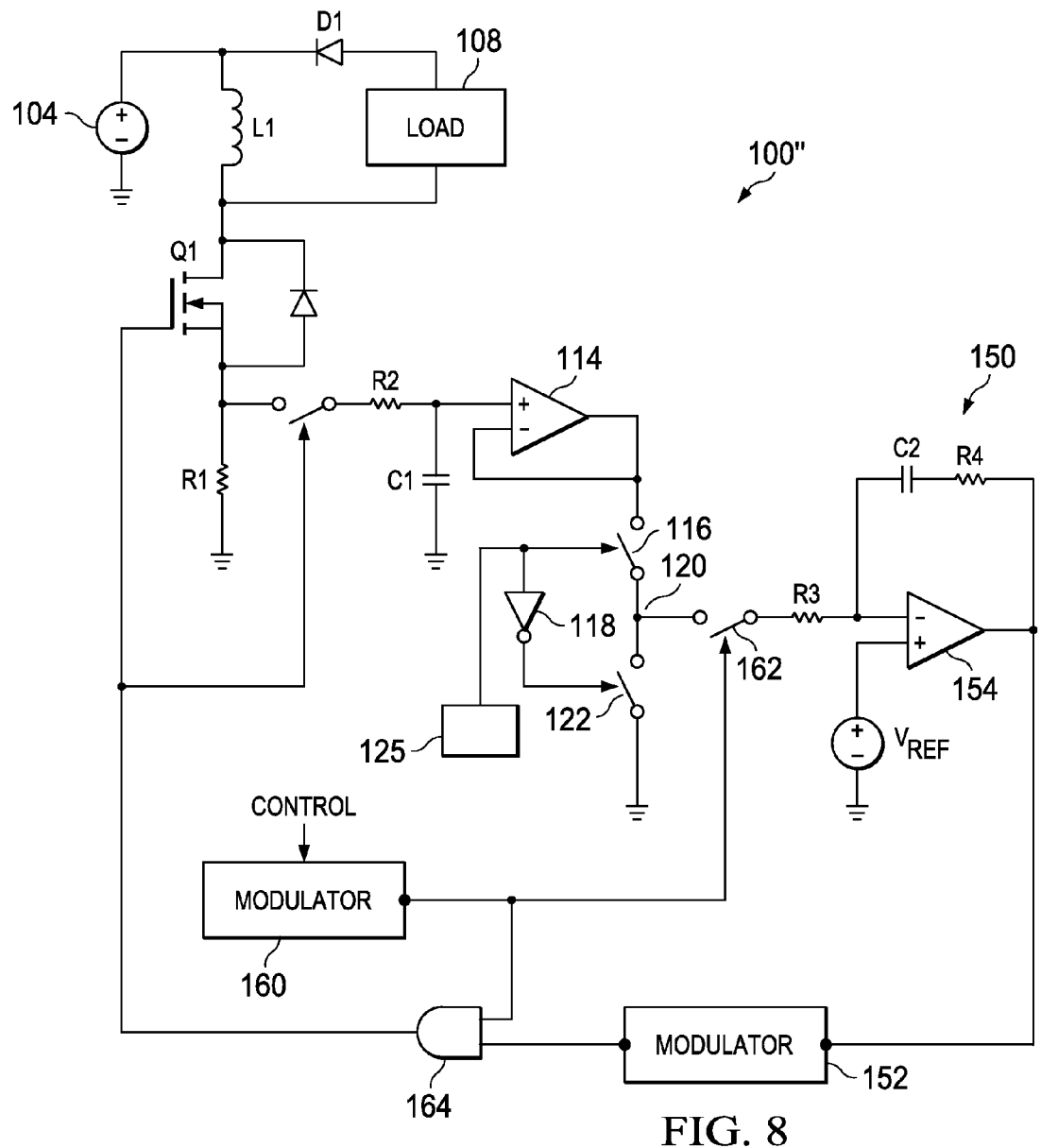
FIG. 8 depicts an example of another closed-loop current control power converter.

FIG. 8 depicts an example of a power converter system 100" that is configured to provide a regulated output that can be decreased without the negative consequences mentioned above. In the example of FIG. 8, this is accomplished by employing an additional outer loop control 158 with respect to the approach in FIG. 5. The outer loop control 158 can implement current control by controlling the modulated signal that is provided to the switch Q1. For example, such outer loop control 158 can be configured to implement a reduced current mode control that reduces the average output current relative to the regulated current that is provided in response to the reference voltage $V_{REF}$. In the reduced current mode, for instance, the outer loop control 158 can control the average ratio between the on-time and off-time for the switch Q1 (e.g., its duty cycle) to a reduced desired value, such that the reduced current mode control afforded by the outer loop (when activated) can be considered duty-cycle control.

In the example of FIG. 8, all components previously introduced with respect to FIG. 5 are demonstrated by identical reference numbers and reference characters. Accordingly, reference can be made to FIG. 5 (and FIG. 4) for additional description of such components. The output of the modulator 152 is provided to the outer control loop circuitry. The outer loop control 158 is demonstrated as including a modulator 160 that is coupled to provide its output signal to a switch 162 and an input of logic, depicted as an AND gate 164. The outer loop modulator 160, for example, can be implemented as a pulse-width modulator that provides a modulated output signal based on a control signal from control circuitry (not shown). The output of both modulators 152 and 160 are provided as inputs to the AND gate 164. The AND gate thus logically ANDs the modulated signals to provide the control signal to enable or disable the switch Q1.

The switch 162 is coupled between the node 120 and the integrator circuit and error amplifier 150. The outer loop modulator 160 provides a modulated output signal to control the switch 162 for selectively connecting the output node 120 with the input of the error amplifier circuitry 150. While the example of FIG. 8 demonstrates the switch 162 for selectively connecting the output node with the error amplifier 150 of the inner control loop, similar functionality could be achieved through other devices, such as by controlling operation of the switches 116 and 122.

The outer loop modulator 160 can disable the main power switch Q1 and concurrently open the input to the error integrator 150. Opening the input in this way (or other techniques) operates to force the integrator 150 to hold its existing operating point. The modulator 160 can be synchronized with the inner loop modulator 152 by appropriate timing control (e.g., having operating frequencies within integer multiples of each other via a common clock). In certain applications, for example, the frequency of the outer loop modulator 160 can be much lower (e.g., about 10-100 times lower) than the frequency of the inner loop modulator 152. Even when the modulators operate at different frequencies, the outer loop can be controlled to operate synchronously with the inner loop modulator 152. Thus, instead of Q1 being controlled directly by the inner loop modulator 152 according to $V_{REF}$, the outer loop modulator 160 can further duty cycle modulate the inner loop control to provide for average current control at reduced levels. The amount of duty cycle modulation provided by the modulator 160 can vary according to application requirements (e.g., ranging from 0 to 1 duty cycle).

As a further example, the system of FIG. 8 can be used to provide current control for light emitting diodes (LEDs), which can include a reduce operating level compared to a regulated output current set according to a substantially fixed $V_{REF}$. In this example, the control signal to the outer loop modulator 160 can be provided as a part of a dimming control, such as in response to detecting demagnetization of an associated winding of the converter system 100'. Thus, the outer loop modulator 160 can duty cycle modulate the inner modulator 152 by selectively enabling and disabling it in a reduced current mode.

As mentioned above, in one embodiment, the reduced current mode can be implemented by the outer loop control from the modulator 160 disabling the control from the inner loop modulator 152 for a period of time (e.g., a time delay) between each sequential operating period of the inner loop control. The time delay, for example, can be integer-multiple of the inner loop modulator's operating period. In an alternative embodiment, the outer loop modulator 160 can permit the inner loop modulator to operate normally for modulating Q1 for a period of time (e.g., plural of its operating periods) and then force Q1 off for a duration of time (e.g., a number of operating periods). It will be understood that each of these examples embodiments can be implemented to provide for the same average current over time, which can be set based on the control provided to the outer loop modulator. Additionally, by implementing an outer control loop in this manner can increase the dynamic range of the control in contrast to the dynamic range if $V_{REF}$ were controlled to decrease the current levels below a regulated output that is proportional to the reference voltage $V_{REF}$.

While the closed loop current control example in FIG. 8 is shown with respect to the buck-boost power converter system 100", similar closed loop current control can be implemented with respect to any topology including those shown and described herein as well as variations thereof. Additionally, the average output current provided by the converter system 100" can be controlled to a programmable reduced level by controlling the ratio of ON and OFF periods for Q1 over time.

Figure 9:
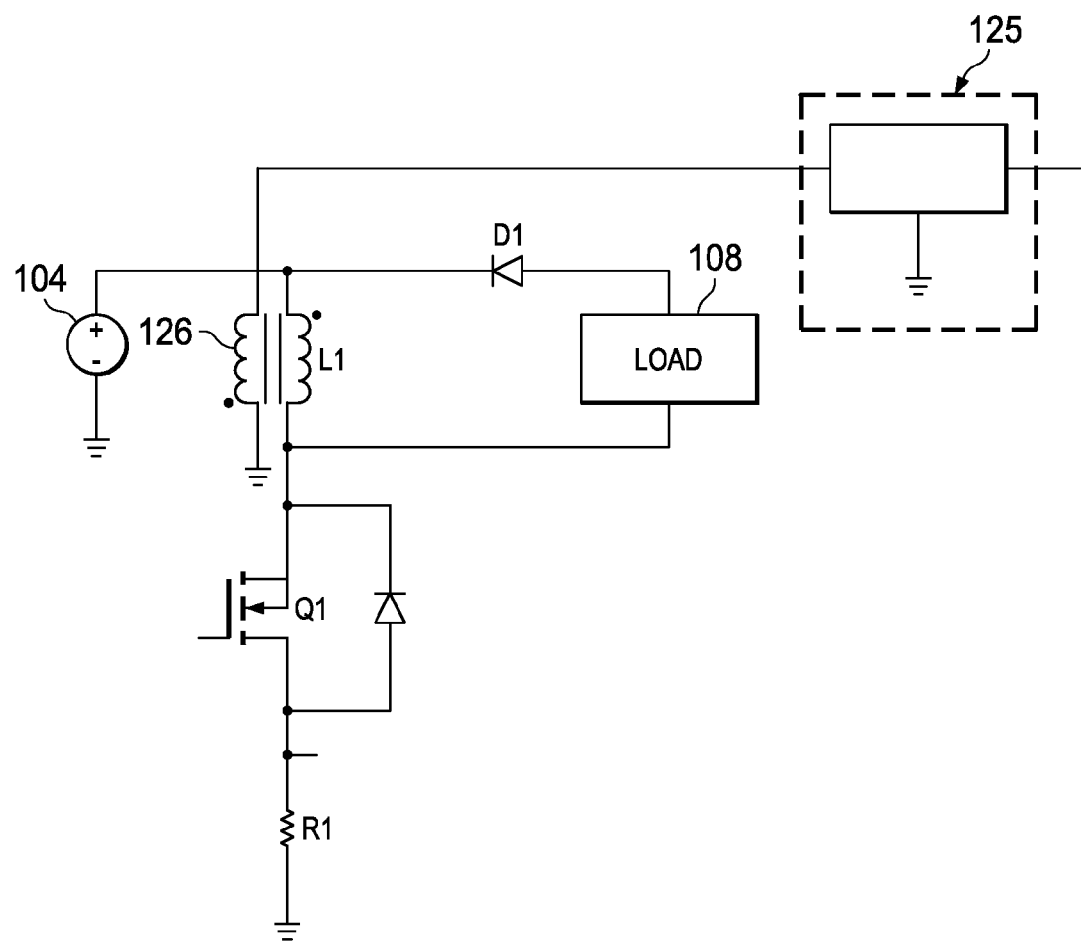
FIG. 9 shows an implantation of a diode conduction sensor.

FIG. 9 shows an example of a diode conduction sensor comprising a winding 126 across inductor L1 feeding a detection circuit 125 which can comprise a comparator (not shown), for example. So What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A system comprising:
a switching power converter configured to convert an input voltage to an output voltage that exceeds the input voltage for providing power at an output thereof to which a load is connectable; and
a measurement system that comprises measurement circuitry configured to measure an average of an accessible current in the switching power converter during both continuous and discontinuous modes of operation and derive an average measurement of another current in the switching power converter based on a timing control signal related to the measurement of the average of the accessible current and used to control operation of the switching power converter, wherein the measurement system further comprises an averaging circuit coupled to provide an output that is proportional to an average current through a switch during conduction of the switch, wherein the averaging circuit is a first averaging circuit, the measurement system further comprising a second averaging component configured to average the output from the first averaging circuit utilizing the timing control signal to provide an output representing the average of the another current.

2. The system of claim 1, wherein the accessible current is an input current of the switching power converter and another current is an output current of the switching power converter.

3. The system of claim 1, wherein the measurement system is configured according to a topology of the switching power converter.

4. The system of claim 3, wherein the topology of the switching power converter is one of a buck topology, a boost topology or a buck-boost topology.

5. The system of claim 1, further comprising timing logic configured to control sampling for the averaging circuit based on the timing control signal.

6. The system of claim 1, further comprising an error amplifier configured to implement the second averaging component and to generate an error signal based on a difference between a reference and the average of the another current.

7. The system of claim 6, further comprising a modulator configured to generate the timing control signal for the switch based on the error signal as to provide closed loop current control for the switching power converter.

8. The system of claim 7, wherein the modulator comprises a first modulator of an inner control loop, the system further comprising an outer control loop configured to perform duty-cycle control on the timing control signal for reducing the output below a regulated output that is proportional to the reference.

9. The system of claim 1, wherein the accessible current is one of an input current of the switching power converter and an output current of the switching power converter, and the another current is the other of the input current of the switching power converter and the output current of the switching power converter.

10. A power system comprising: an input source to supply an input power;
a switching power converter configured to convert an input voltage to an output voltage that exceeds the input voltage, the switching power converter comprising:
a switch to conduct a switch current in response to a timing signal having a timing period, wherein the timing period is a selected portion of less than 100% of the timing signal: an inductor to conduct current based at least in part on the switch current;
a rectifier configured to conduct current based at least in part on the switch current; and
a measurement system configured to provide a measure of average current during both continuous and discontinuous modes of operation through the switch during the selected portion of the timing period, the selected portion of the timing period depending on a topology of the switching power converter, wherein the measurement system further comprises a switch coupled between an averaging circuit coupled and a current measuring device to provide an output that represents an average current through the switch only during the selected portion of the timing period, further comprising an averaging component configured to provide a time-averaged measure of the measure of average current through the switch during the selected portion of the timing period utilizing the timing signal to operate a first switch coupling a node to the averaging circuit and a second switch coupling the node to a reference.

11. The power system of claim 10, wherein the measurement system is configured to measure an average of an accessible current in the switching power converter and derive an average measurement of another current in the switching power converter based on timing control signals used to control operation of the switching power converter.

12. The power system of claim 11, wherein the accessible current is an input current provided to the switching power converter and another current is an output current provided to a load by the switching power converter.

13. The power system of claim 12, wherein the measurement system is configured according to (i) the topology of the switching power converter, (ii) which current in the power converter is the accessible current and (iii) which current in the switching power converter is the another current.

14. The power system of claim 13, wherein the topology of the switching power converter comprises one of a buck, boost or buck-boost topology.

15. The power system of claim 10, further comprising timing circuitry configured to control sampling for the averaging circuit based on the timing signal and depending on the topology of the switching power converter.

16. The power system of claim 10, wherein the averaging circuit is a first averaging circuit, the measurement system further comprising a second averaging circuit configured to measure a time average of the output from the first averaging circuit to provide an output corresponding to the average of the another current.

17. The power system of claim 10, further comprising:
a feedback loop configured to generate an error signal based on a time-averaged measure of the average current through the switch during the selected portion of the timing period relative to a reference; and
a modulator to provide the timing signal based on the error signal as to provide closed loop control for the power system.

18. The power system of claim 17, wherein the feedback loop comprises an inner loop and an outer loop, the outer loop being configured, when activated in a reduced power mode, to duty cycle modulate the inner loop for reducing the output of the system.

\* \* \* \* \*